United States Patent
Takeyama et al.

(10) Patent No.: US 9,772,225 B2
(45) Date of Patent: Sep. 26, 2017

(54) SPECTROSCOPIC DEVICE

(71) Applicant: GENESIA CORPORATION, Mitaka-shi, Tokyo (JP)

(72) Inventors: Norihide Takeyama, Mitaka (JP); Yoshikazu Kanai, Tokorozawa (JP); Daisuke Fukuoka, Chiba (JP)

(73) Assignee: GENESIA CORPORATION, Mitaka-Shi, Tokyo (JP)

( * ) Notice: Subject to any disclaimer, the term of this patent is extended or adjusted under 35 U.S.C. 154(b) by 0 days.

(21) Appl. No.: 15/134,950

(22) Filed: Apr. 21, 2016

(65) Prior Publication Data
US 2016/0370229 A1 Dec. 22, 2016

(30) Foreign Application Priority Data
Apr. 21, 2015 (JP) .................. 2015-086938

(51) Int. Cl.
*G01J 3/00* (2006.01)
*G01J 3/02* (2006.01)
(Continued)

(52) U.S. Cl.
CPC .......... *G01J 3/0208* (2013.01); *G01J 3/2823* (2013.01); *G02B 13/16* (2013.01); *G02F 1/133528* (2013.01)

(58) Field of Classification Search
CPC .. G01J 3/02; G01J 3/42; G02F 1/1335; G02B 5/30; G02B 27/28; G01N 21/31; G01N 21/55
See application file for complete search history.

(56) References Cited

U.S. PATENT DOCUMENTS

| 5,132,826 A | 7/1992 | Johnson et al. |
| 2007/0268574 A1* | 11/2007 | Sasaki ................ G02B 21/0032 359/385 |

FOREIGN PATENT DOCUMENTS

| JP | H07-198398 A | 8/1995 |
| JP | H11-23891 A | 1/1999 |

(Continued)

OTHER PUBLICATIONS

Notification of Reason(s) for Refusal, and English language translation thereof, in corresponding Japanese Application No. 2015-086938, dated Jul. 22, 2015, 4 pages.
(Continued)

*Primary Examiner* — Abdullahi Nur
(74) *Attorney, Agent, or Firm* — Brinks Gilson & Lione (57) ABSTRACT

A spectroscope device is provided to maintain the uniformity of the central transmitting wavelength in the field of view and to minimize the broaden of the bandwidth of the transmitting wavelengths in an optical lens using an optical tunable filter (variable wavelength filter), even with a wide field of view and/or a large numerical aperture. A space is defined in which, when each beam that is incident from each off-axial object point on the object surface toward the optical lens that includes a plurality of lens elements between an object surface and a conjugate real image surface reaches the optical tunable filter, the chief ray is maintained parallel to the optical axis. Therefore, if an optical tunable filter is disposed in this space, each beam is always incident normal to the filter, so only the narrow band components at the specific central wavelength can be transmitted.

8 Claims, 8 Drawing Sheets (51) Int. Cl.
*G02F 1/1335* (2006.01)
*G01J 3/28* (2006.01)
*G02B 13/16* (2006.01)

(56) References Cited

FOREIGN PATENT DOCUMENTS

| JP | 2000-321424 A | 11/2000 |
|----|---------------|---------|
| JP | 2001-141564 A | 5/2001 |
| JP | 2003-215530 A | 7/2003 |
| JP | 3979535 B2 | 9/2007 |
| JP | 2010-237097 A | 10/2010 |
| WO | WO 2008/108846 A1 | 9/2008 |

OTHER PUBLICATIONS

Notification of Reason(s) for Refusal, and English language translation thereof, in corresponding Japanese Application No. 2015-086938, dated Nov. 18, 2015, 5 pages.

\* cited by examiner

SPECTROSCOPIC DEVICE

FIELD OF THE INVENTION

The present invention relates to technology for acquiring and analyzing spectrographic properties that reflect at least one of the physical, chemical, and biological states of an object being measured, and in particular relates to technology for the structure of an optical lens in a spectroscopic device for determining the type and/or state of an object being measured using an optical tunable filter (wavelength-tunable filter).

DESCRIPTION OF THE RELATED ART

A 3-dimensional image obtained by associating spectrographic wavelength information (X coordinate) with to the 2-dimensional positional information (X and Y coordinates) of an object being measured is referred to as a hyperspectral image, and be corresponds to a series sets of data consisted of images for many narrow bands of wavelength. The simplest hyperspectral image is the so-called color image (true color image) that is expressed by the intensity ratios of three color elements, for example red (R), green (G), and blue (B). However, with the intensity ratios of only three color elements, the color distinctiveness is limited, and it is not easy to distinguish between, for example, a natural object and an artificial object imitating the natural object with artificial coloring. The more number of monochromatic information provides the better distinguishability of spectral index. If, for example, information can be acquired by dividing the visible and near-infrared wavelength range (from 400 nm to 800 nm) into several tens of continuous narrow band of wavelengths, the variety and/or conditions of the object being measured can be determined more accurately.

To date, several devices have been developed to obtain hyperspectral images, and these devices can be generally classified into the following three types.

(1) A plurality of cameras is disposed in parallel, and a narrow band filter that transmits only a specific wavelength band is mounted in each camera of the plurality of cameras.

(2) A plurality of narrow band filters is provided, one for each color, and a mechanism is provided to successively exchange the narrow band filters on a single camera.

(3) After the successive process to obtain the spectral images along the adjacent linear regions on an object surface by using a dispersive device such as a diffraction grating or a prism, extracted narrowband images from the many spectral images for the specific wavelength are reproduced into a two-dimensional area image at the interesting wavelength.

However, in the case (1) as mentioned above, configuration of optics can be simple, but the overall size of whole optics may be huge. Furthermore, it is not possible to vary the transmitting wavelengths during operation. The case (2) is not adequate to observe any objects which have time dependence in the spectral profile, because it needs several seconds in exchanging each of narrow band filters. In addition, even if an object has no time-dependence in an observational period, when such spectrograph is installing on a vehicle such as a spacecraft or a truck, the spectrograph in the case (2) cannot obtain a hyperspectral image consists of many narrow band images taken at a common point of view. The case of (3) is capable to reproduce some of hyperspectral images from many narrow band images by post-processing. While, since the spectrograph in the case (3) is mechanistically complex, ensuring the reliability against any mechanical vibrations requires well mechanical robustness, which causes fabrication cost to be expensive.

A liquid crystal tunable filter (LCTF) is a spectroscopic device that can deal with the issues in each of the above types of spectrograph for obtaining multi-color images (e.g., see the Japanese Patent No. 3979535). An LCTF has the several advantageous in which any narrow band wavelength can be selected in real time, and the LCTF may be configured to be compact/lightweight and sufficient robustness against vibration if needed.

SUMMARY OF THE INVENTION

An LCTF comprising liquid crystal cells and polarizing elements can be a liquid crystal filter that allows for tuning wavelengths based on electronical control without using any moving mechanism. By applying a set of voltages to the LCTF to adjust the retardation of the liquid crystals, the LCTF selectively extracts a specific transmitting band from the incident white light.

However, LCTFs have the following two technical weaknesses, which have limited their practicability.

(1) The wavelength of the light that passes through an LCTF depends on the angle of incidence of the light aiming to the LCTF. This effect produces the field-position-dependence of the central wavelength of the transmitting band, and leads spectral ununiformity of the image, which is depending on the location of the optical sensor in the optical unit as a spectrograph, or leads broadening of the transmitted bandwidth. These disadvantages are particularly significant with a wide field camera, and/or with larger numerical aperture.

(2) Since the LCTF is configured as a polarizing filter, only a specific component of the polarization can transmit through the filter. Thus, if the incident light from the object is polarized, the spectral properties of the object will be degenerated with the polarization of the object. Therefore, it is difficult to distinguish the spectral properties from the polarization state which is deeply relating to the observing conditions of the objects.

Therefore, in order to resolve above problems, the present invention provides a technology to maintain not only the field uniformity of the central wavelength, but also, suppression of bandwidth broadening, which are associated with an optical unit using a variable wavelength filter such as an LCTF, especially even field of view is wide and/or numerical aperture is large. It would be also desirable to provide technology to enable hyperspectral data to be obtained, without being affected by polarization direction or the degree of polarization of the incident light from the object. In addition, it would be desirable to provide technology to acquire polarization information of the object being measured.

In order to resolve problems mentioned above, the optical lens unit according to the present invention includes optical lens elements comprising in the conjugate between an object surface and the corresponding image surface, wherein the lens element(s) receiving a beam emitted from each of off-axial objects on the object surface.

The optical lens unit includes at least one optical tunable filter for selecting any wavelength of the beam, wherein at least one light ray contained in the beam being parallel to an optical axis in a space between the plurality of lens elements, and the optical tunable filter is disposed in the space.

Also, the present invention can include at least a depolarizer between the object surface and the optical tunable filter, and can further include at least one polarizer between the object surface and the depolarizer, which is for rotating the polarization direction of the incident beam.

In addition, the light ray contained in the beam being parallel to an optical axis can be the chief ray of the beam. Furthermore, the optical lens unit according to the present invention can include a light measurement device that is capable of measuring at least one of wavelength, intensity, and/or polarizational information of the incident beam by any configuration using the optical unit as described above.

In the optical unit according to the present invention includes plurality of optical lens elements between the object surface and the adjacent real image surface as the conjugate of the object surface, and at least an optical tunable filter which can vary the transmitting wavelength.

The optical elements create the space where at least an incident ray (in particular, chief ray) from each of off-axial objects on the object surface toward the optical unit is substantially parallel to the optical axis in the space where the optical tunable filter is installed or disposed. And the optical unit can include at least an optical detector which can detect any rays transmitted through the optical tunable filter.

Therefore, when the optical tunable filter (that is used as a bandpass filter which can vary the wavelength where it is at the peak transmittance) is disposed in the space where the optical tunable filter is installed or disposed, at least one ray in a beam propagating from each of object point always being incident normal to the optical tunable filter, even if the field of view is wide and/or numerical aperture of the optical unit is large. In particular, when the oblique angle of the chief ray is zero (parallel to the optical axis), the oblique angles of corresponding marginal rays in the beam are minimized, so that the angles of incidence for any rays in the corresponding beam are also minimized to the normal to the optical tunable filter, which can maximize the selectivity of the wavelength by the optical unit.

For the design of optical unit as stated above, it is desirable that the clear aperture of beams passing through the optical tunable filter are larger than the entrance pupil diameter of the optical unit, because this condition can leads making oblique angle of the rays onto the optical tunable filter (or the oblique angle with respect to the optical axis) smaller, and causes better performances to obtain both spectral uniformity and minimum broadening in bandwidth. In this way, a whole detected image can be tuned into the interesting unique wavelength band, uniformly and can be reduced the broadening of the bandwidth, even for a wide field of view and/or a large numerical aperture.

Also, by installing a depolarizer in front of the optical tunable filter in the optical unit of the present invention, the spectral properties of the object being measured itself can be extracted without being affected by polarized light, even when the light beams from the object being measured includes polarized light components. Also, by disposing a polarizer in front of the depolarizer, the polarized light component from a specific direction only can be extracted. In addition, by providing a mechanical and/or electronical rotator capable of controlling the light polarization direction as desired, the phase conversion of the polarized light can be easily adjusted, so any of the complex amplitude information (wavelength information, amplitude information, and phase information) included in the light from the object can be easily acquired.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION OF THE PREFERRED EMBODIMENTS

The following is a description of an embodiment of the optical lens according to the present invention, with reference to the drawings. Note that a variable central wavelength filter disposed in the optical lens of the present invention is described as a liquid crystal tunable filter (hereinafter, referred to as an "LCTF"), but it is not limited, and can be installed any other types of variable central wavelength filter, such as a tunable Fabry-Perot interferometer.

Figure 5:
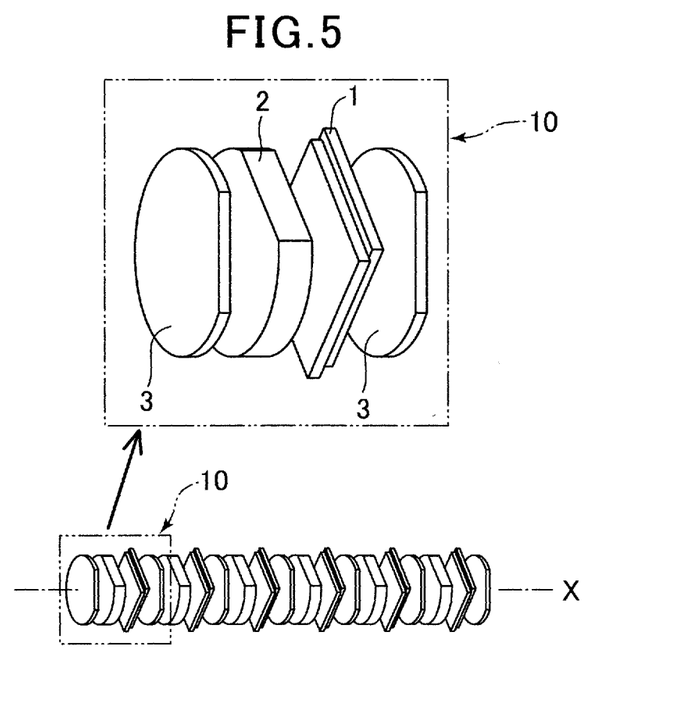
FIG. 5 is a schematic illustration indicating for the structure of LCTF.
Figure 6A:
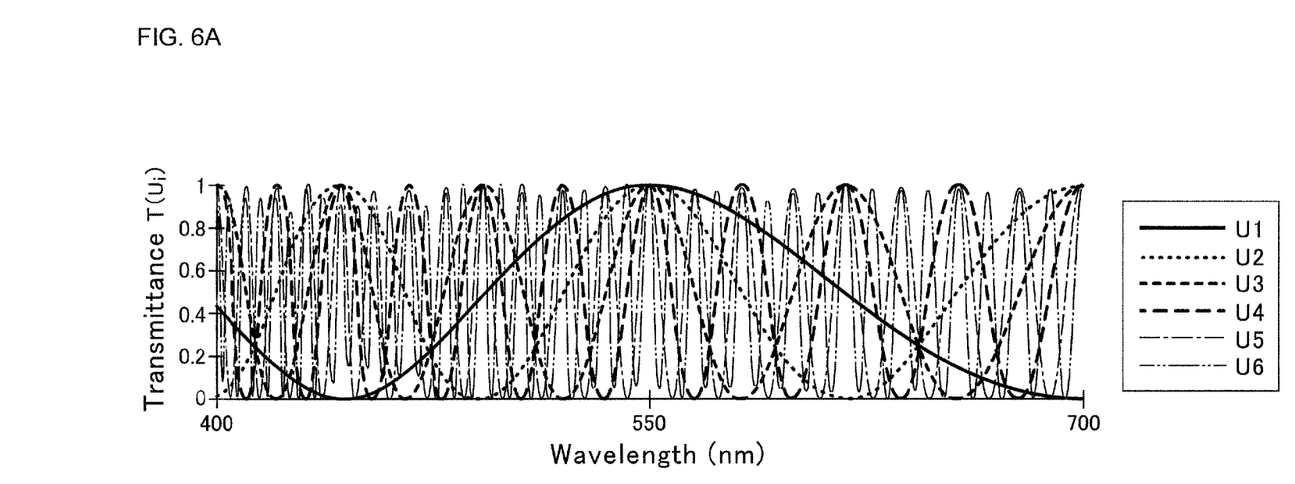
FIGS. 6A and 6B illustrate an example of spectral transmittances of individual LCTF cells and the relating transmittance of a narrow band pass filter comprising all LCTF cells, respectively.
Figure 6B:
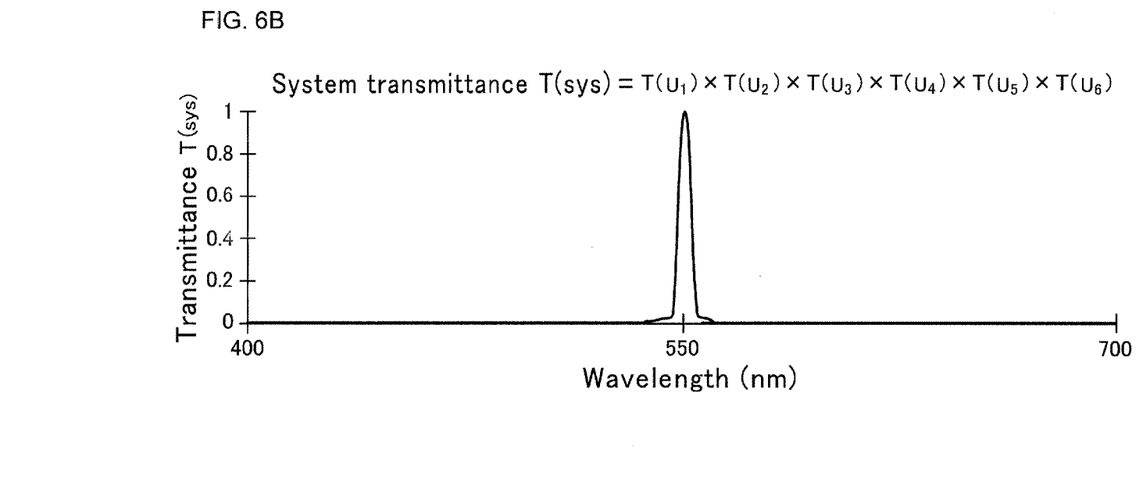

To clarify the differences between the present invention and the conventional technology, a conventional spectroscopic device using an LCTF will be described first. As illustrated in FIG. 5, an LCTF 10 is configured from a plurality of units stacked to form a laminate-based configuration, and the each unit of the plurality of units comprises a liquid crystal cell 1, a birefringence filter 2, and a polarizing element (polarizing filter) 3. In other words, the LCTF 10 includes a multiple of stages configured from the birefringence filter 2 and the liquid crystal cell 1 sandwiched between two polarizing filters 3, and the wavelength bandwidth of the transmitted light may be controlled by changing the voltage applied to the liquid crystal cell 1 of each unit. The transmittance Ti (i=1 to 6) of each unit (U1 to U6) varies periodically along the wavelength axis (see FIG. 6A). Therefore, if the spectral transmittance of the distinct period is provided to each unit, integrated spectral transmittance of the laminate-based LCTF (stacking all units) is the product of $T(U1) \times T(U2) \ldots \times T(U6)$, which can play a role as a narrow band pass filter. (see FIG. 6B).

By appropriately setting of the voltage applied to each liquid crystal cell, the transmitting wavelength of each unit can be adjusted as desired without a mechanical operation, and as a result, the central wavelength of the transmitted light of the overall laminate-based LCTF can be selected as desired. Therefore, the quantity of color information obtained can be significantly increased, and the distinctiveness of the spectroscopic indices can be markedly improved.

Also, the transition time required to switch from any wavelength to any other wavelength depends on the combination of the units, but is normally several tens of milliseconds, so narrow band image at the interesting wavelength can be rapidly tuned out.

The LCTF can determine the type and/or state of the object rapidly and accurately, which is due to acquiring spectral information of the object in the way without any contact on the object. While, the central wavelength of the transmitting band and the band width are significantly depends both on the incident angle of the light to the LCTF and angular distribution of the incident angles. This leads the non-uniformity of the central wavelength within the field of view of the LCTF based spectrograph.

Figure 7:
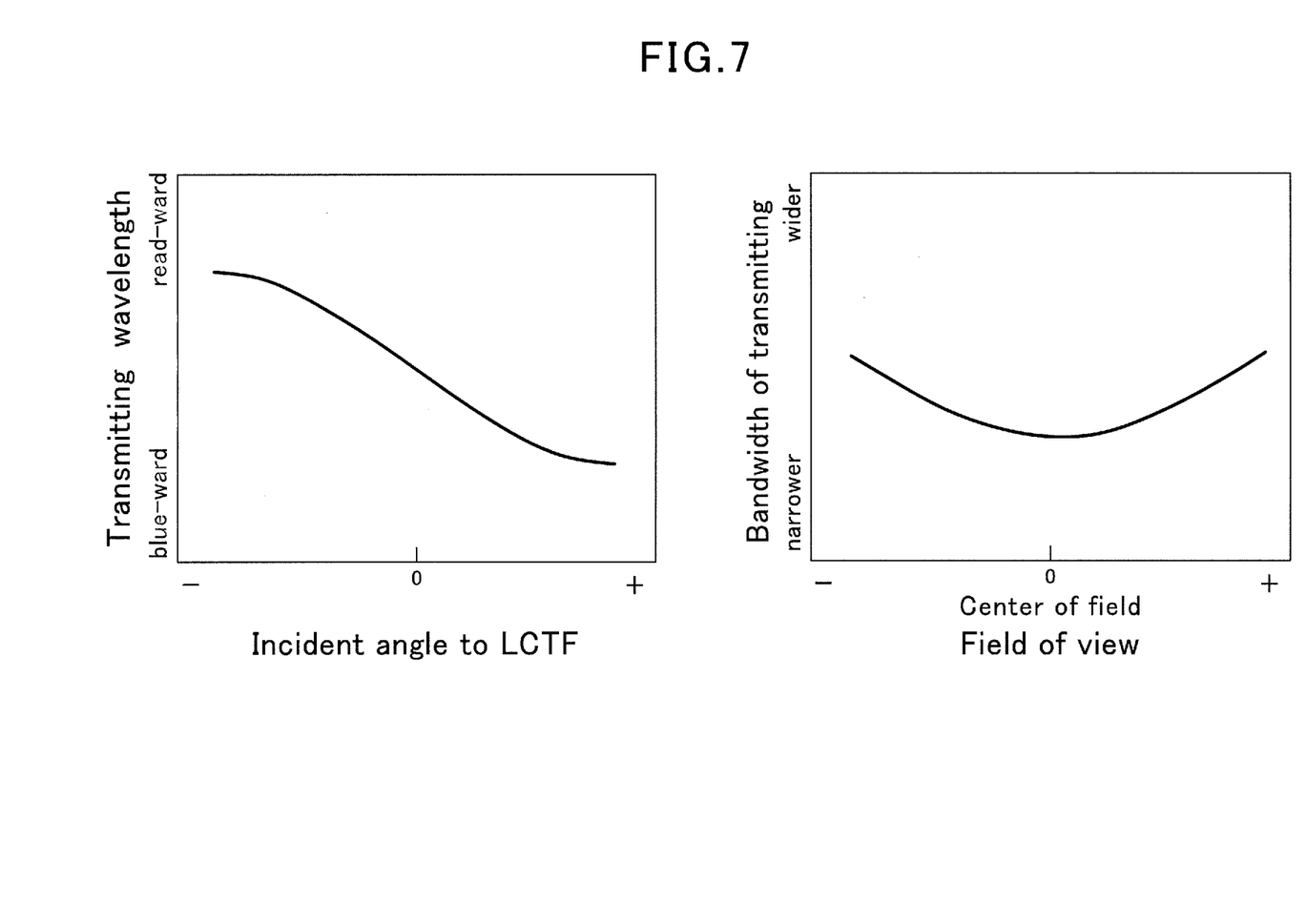
FIG. 7 illustrates the incident angle dependence of the optical property. The left panel is for the central wavelength of LCTF, and the bandwidth in the right panel, respectively.

This effect generally appears rotational asymmetrically around the normal axis of the LCTF surface as illustrating in FIG. 7 for example, when the incident angle to the LCTF is increased to the positive-ward, the central wavelength is sifted to the blue-ward, and vice versa (that is, when the incident angle is changed toward the negative-ward, central wavelength is sifted to the red-ward. Thus, the transmitting bandwidth becomes broader when cone angle of the incident beam is larger.

Figure 8:
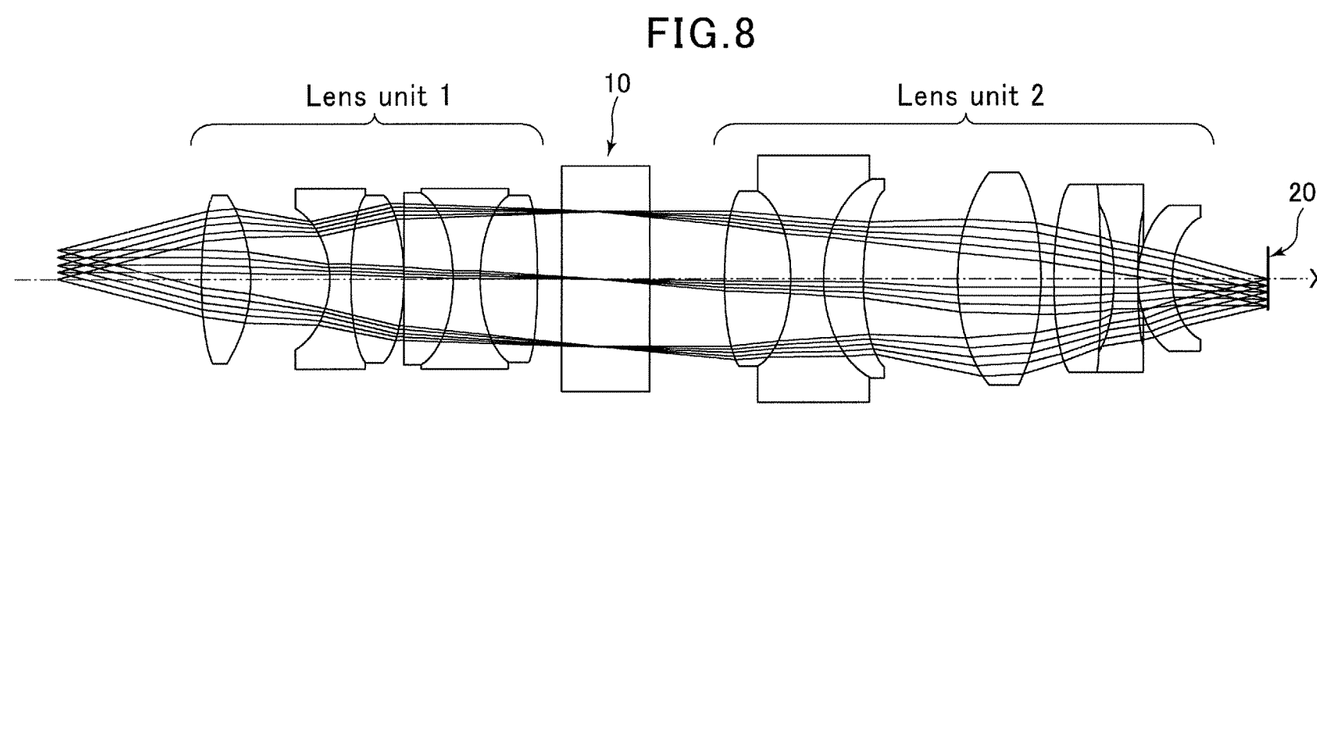
FIG. 8 illustrates example of the beam pass propagating in the conventional optical lens assembly.

As illustrated in FIG. 8, conventionally, a lens unit 1 and a lens unit 2, both in which a sharp image can be acquired when each lens unit is in the infinite conjugation, are configured to be disposed facing each other on the enlargement side.

Polychromatic light from each point on the object surface is collimated into a parallel beam by the lens unit 1. By allocating a LCTF 10 at the exit pupil position of lens unit 1, this optical layout allows the passing only the limited wavelength through the LCTF, and thus narrow band image can be formed on the image surface 20 by the lens unit 2.

However, in this case, it is impossible to fully achieve the spectral uniformity of the central wavelength within the whole image coverage, when an image covers with a wide field of view. The reason is relating to the being tangible of the problem discussed above, which means that the incident angle of any oblique beams to the LCTF 10 naturally become significantly larger relative to the normal axis of the LCTF surface. Thus, conventional configuration illustrated as FIG. 8 has been used only in the case which the field of view thereof is limited in the narrow field.

Figure 1:
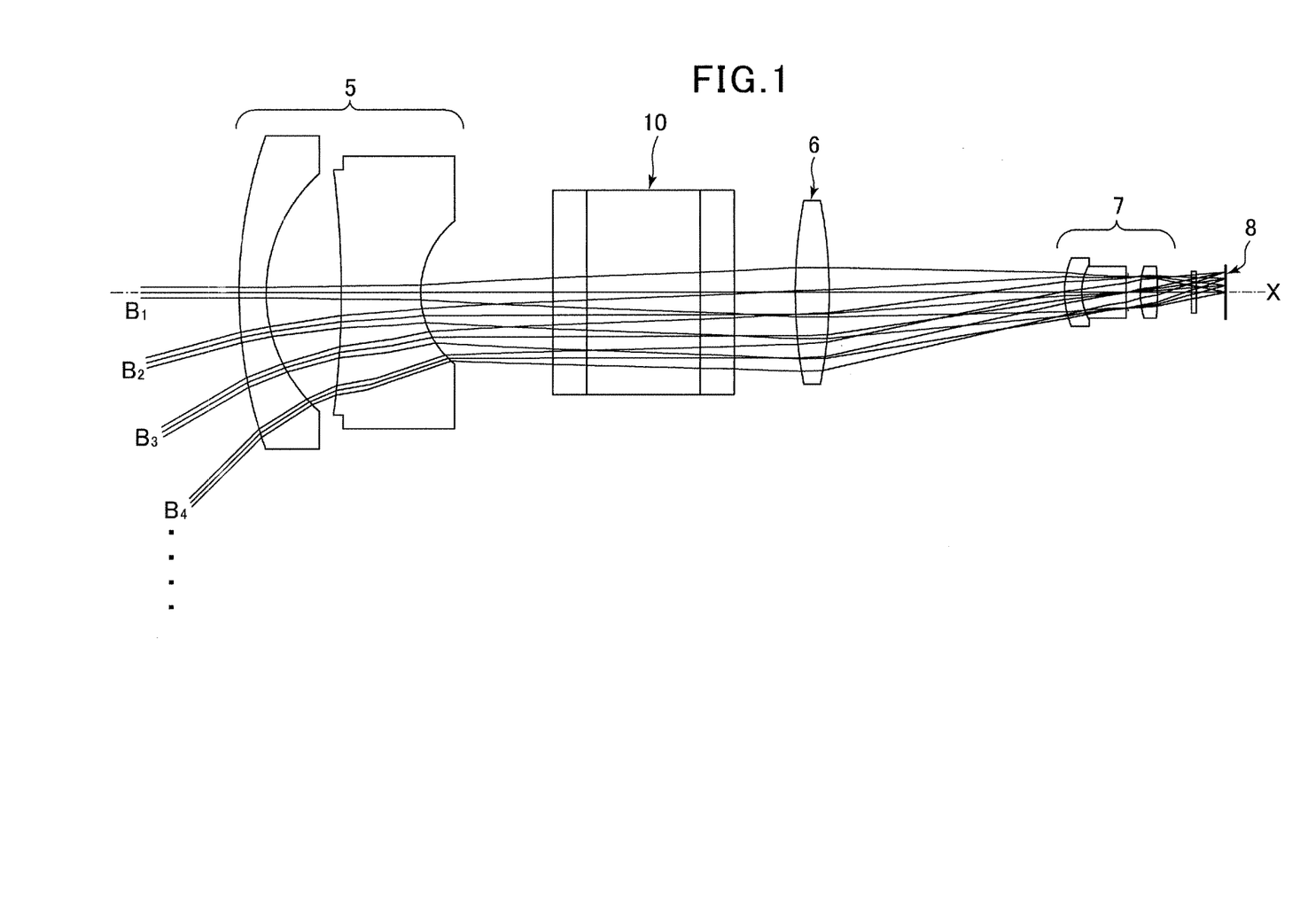
FIG. 1 illustrates a sectional view of an optical lens unit according to the present invention, illustrating the light beams from the object being measured, through the LCTF.

In contrast, as illustrated in FIG. 1, the lens configuration of the present invention comprises the lens elements (the first lens unit 5, the second lens unit 6) disposed between the object surface and adjacent real image surface as the conjugate surface of the object surface, and all of the beams propagating toward the first lens system 5 from any positions on the object surface are arranged to be a common marginal angle relative to the normal axis of LCTF 10.

More specifically, by the lens unit 5, chief rays for each beam from off-axial object points are arranged to be parallel to the optical axis X in the space between the object surface and the first lens unit 5. Therefore, if the LCTF 10 is disposed in the space, the beams from any positions over a wide field of view (in particular, see the beam B4) nearly vertically enter onto the LCTF 10 (i.e., the incident angle relative to the optical axis X is substantially zero, then the angle is substantially normal to the entrance surface of the LCTF). However, practically, it is not necessary what the chief rays aiming to the LCTF 10 are completely parallel to the optical axis X. The incident angle of the beam aiming to the LCTF 10 can be maintained within a narrow range of angles. In order to achieve the spectral properties of the LCTF 10, the incident angle of each chief ray contained in the beam should be maintained less than 10 degrees relative to the optical axis X.

Note that taking into consideration that optical aberration occurs in real use cases, the chief rays might not be parallel to the optical axis X, and other light rays could also be parallel to the optical axis X. Thus, the present embodiment can be applied to the case that any other ray rather than the chief ray in the beam is parallel to the optical axis on the entrance surface of LCTF. Also note that as a result of aberrations, a plurality of rays within a beam may be simultaneously parallel to the optical axis, but in this case also the present invention can be applied.

In this way, for beams from any positions over a wide field of view, the chief ray of each beam is made parallel to the optical axis X by the first lens unit 5 (and the divergence angles of rays other than the chief ray are minimized), and subsequently the paralleled or substantially-paralleled rays can enter the LCTF. Thus, over the whole field of view, in particular over a wide field of view, the central wavelengths for each light beam that has propagated through the LCTF can be uniformly maintained. As a result, since the shifts of the transmitting wavelength corresponding to any positions in the field of view can be negligibly small, only the transmitting bands which are uniformly tuned by the LCTF 10 can produce the final image by the third optical unit 7, and can be acquired narrow band image without significant wavelength shift in the whole image coverage.

Figure 2:
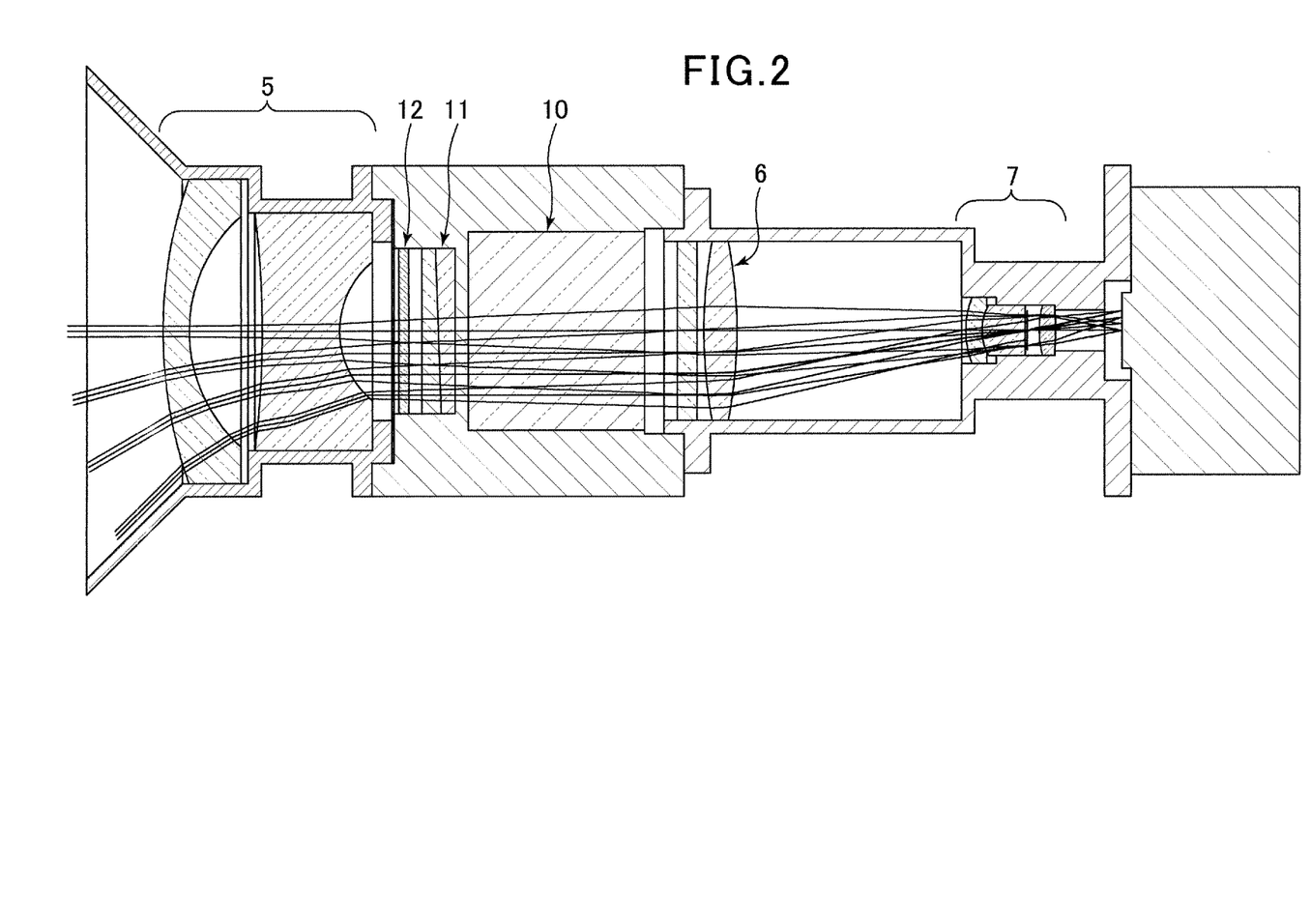
FIG. 2 illustrates an example of a spectroscopic device incorporating the optical lens according to the present invention, illustrating the light beams propagating from the object being measured, and the optical paths through the LCTF.

Further, for the wide field of view, it should be noted that the bandwidth of the acquired narrow band image obtained by a spectrograph which incorporates the LCTF 10 into the lens configuration of the present invention as illustrated in FIG. 2, depends on the angular distribution of the incident angles of each ray in the beams onto the LCTF, thus bandwidth can be slightly broaden. However, because the setting of the rays aiming to the LCTF has angler uniformity for whole field of view, the amount dependence of broadening can be negligibly small and the spectrally uniform over the whole image.

Note that in addition to the LCTF 10, the configuration of a spectral imaging device with the LCTF 10 illustrated in FIG. 2 as one of example further includes a depolarizing plate 11 and a polarizer 12 as will hereinafter be described in detail, which are described later.

In addition to the technical advantage of being able to deal with a markedly wider field of view, the present invention may easily achieve a compact spectroscope imaging device because the LCTF 10 is not disposed in the space facing two infinite conjugates configured by the lens unit 1 and unit 2 as illustrated in FIG. 8.

Also, the optical configuration of the present invention has the technical advantages of not only providing of an acquiring image for an object being measured covered with a wide field of view, but also solving the problem caused from the LCTF 10 incorporated into an unit with a fast optics (large numerical aperture) even for a narrow field of view.

The background is that the plurality of rays propagated from each object point toward an optical imager with a large numerical aperture are not uniformed each other with respect to the incident angle relative to the LCTF, so that the such rays that have propagated through the LCTF 10 cause various central wavelengths in a beam, and then the produced image composed by such rays is to be an image with broaden bandwidth.

Generally, since narrower the width of transmitting band corresponds the higher monochromaticity, it is natural that the broadening amount is constrained within a required criteria. However, in a conventional imaging optics with large numerical aperture, the transmitting band width in wavelength cannot be made narrow. In contrast, the lens layout of optical configuration in the present invention can provide the significantly higher uniformity of the incident angle to the LCTF 10, and manage chief rays to be parallel to the optical axis X. Thus, for each incident beam comprising the chief ray from each object point on the object plane toward the LCTF 10, each incident angle relative to the LCTF 10 maintains within a narrow range which centered must be zero. Therefore, it is avoided to broadening the transmitting band width of the LCTF caused by the variation of oblique incidence. so that it is possible to realize the desired an tunable narrow band filter.

Figure 3:
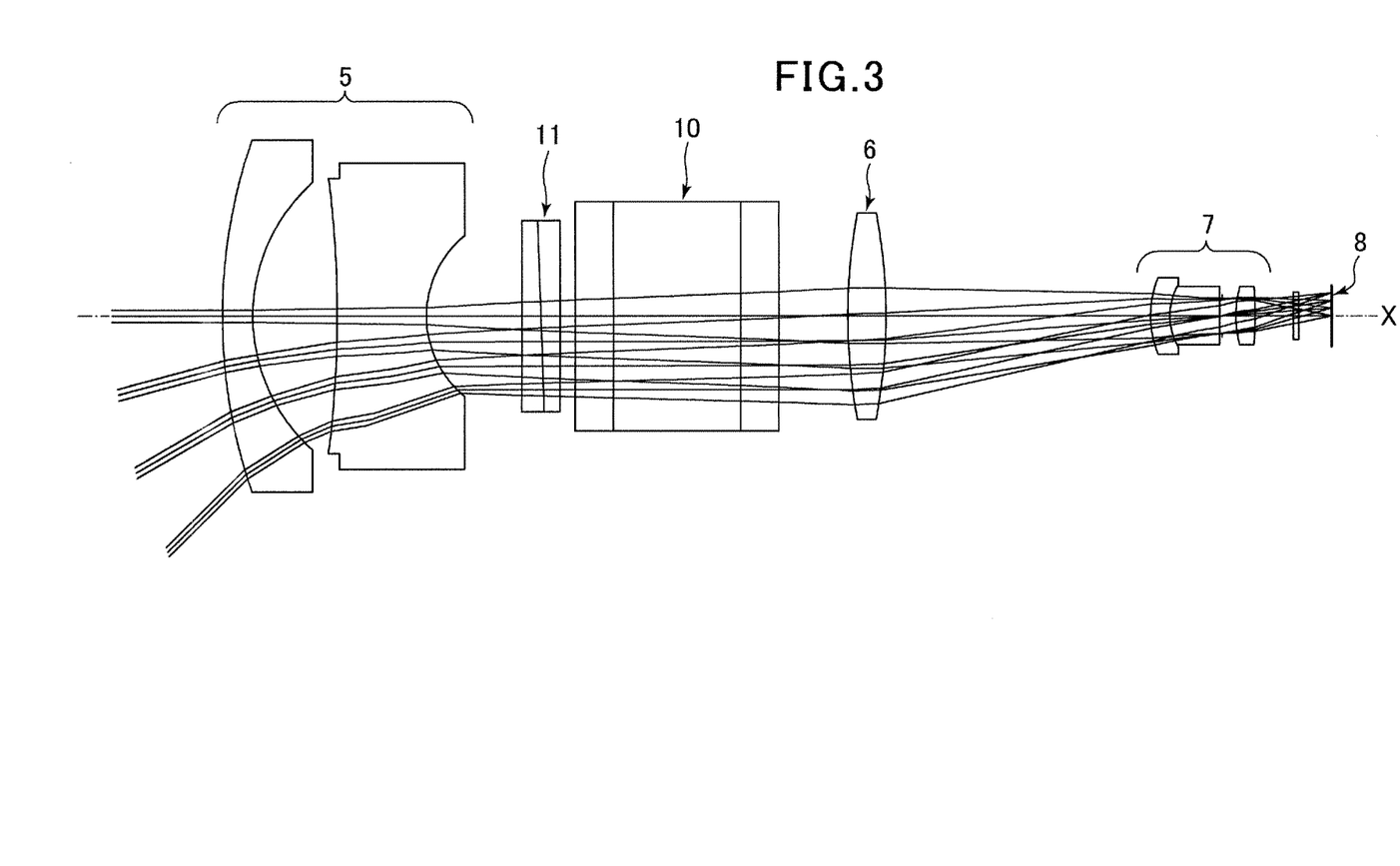
FIG. 3 illustrates an explanatory view indicating the location of a depolarizing element.

Next, the exemplary embodiment of the present invention is provided to use the depolarizer 11 (in FIG. 3) with the optical lens units. As stated above, the LCTF 10 is configured to include polarizers, only a specific polarization component can be transmitted. In the case that an object of spectral imaging is such as a leaf of a plant outdoors, the only a specific polarization component can be reflected from the leaf, if the sunlight illuminates the leaf along the specific direction. If the polarizing element 3 (in FIG. 5) from which the LCTF is configured to be installed in the orientation such that this component from the leaf is not transmitted, then light that conforms to the spectral wavelength of the LCTF and that should be transmitted could be blocked as the polarized component, and the measurement will be carried out as if that light did not exist. Orientation and degree of polarization of the polarized light which is aiming to the LCTF can be changed due to variation of the relative angle between a light source and an object being measured. So, even if the optical properties are never changed in the beam from the object, significant artificial change can be produced in the acquired hyperspectral information.

In order to solve this problem, the prevent invention depolarizes the polarized light before the beam arrives to the LCTF. In other words, the depolarizing plate 11 (in FIG. 2, FIG. 3) is disposed between the object being measured and the LCTF 10, and the phases of the ray included in each beam are highly disturbed randomly, so that each beam includes all of the phases of the polarization. As a result, even if the beam from the measured object is highly polarized, polarization anisotropy of the incident beam becomes isotropic on the entrance surface of LCTF 10. So that the polarization information of the incident beam is not superimposed on the acquired spectral information, and it can resolve a degeneracy between the observational environment and the spectral property of the object successfully, so it is possible to extract the spectral properties only of the object being observed.

Figure 4:
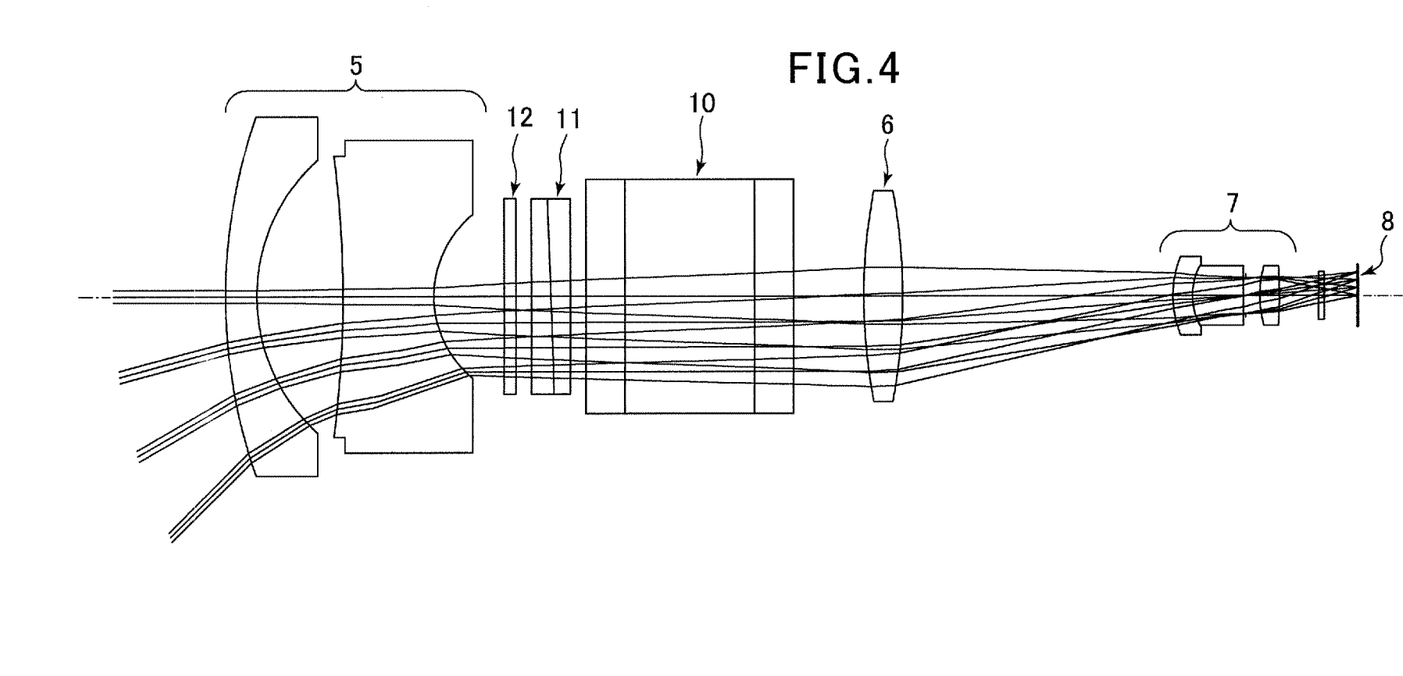
FIG. 4 illustrates an explanatory view indicating the location of a polarizing element.

Depolarizing the beam with polarization information that is propagating from the object being measured using the depolarizing plate 11 disposed in front of the LCTF 10 means that the polarization information of the beam which the object being measured originally had is not used. Therefore, preferably, the polarizer 12 (in FIG. 2 and FIG. 4) is disposed in front of the depolarizing plate 11 of the optical lens of the present invention, in other words, between the object being measured and the depolarizing plate 11. The polarizer 12 is inserted, the polarizer is controlled to enable the degree of phase transformation to be varied so that the polarization direction of the light from the object being measured and the polarization direction of the polarizer coincide to maximize the intensity or the like.

Then, the beam is depolarized by the depolarizing plate 11, so that the beam component which matched just to the tuned wavelength passes through the LCTF 10. In this way, the wavelength (color), the amplitude (intensity), and phase (polarization) of the incident beam can all be detected.

Also, the polarizer 12 can be rotated around the optical axis of the lens system. The extracted polarization direction can be selected by rotating the polarizer 12. In this way, it is possible to extract the polarization component in only a specific direction from the object being measured. However, rotating the polarizer 12 is just one means for extracting specific phase information, and any means may be used in order to control the polarization direction by an electronic method or a mechanical method. Note that originally the LCTF 10 functioned optically as a polarizer, so rotating the LCTF 10 around the optical axis of the lens without providing the depolarizing plate 11 and the polarizer 12 is one method of extracting the orientation of the polarized light from the object being measured. However, in principle, electrical wiring must be provided to apply voltage to the LCTF 10, so incorporating a rotational function is difficult in terms of the wiring routing. However, the configuration of the present invention as described above has the technical significance that this difficulty is avoided.

Although not limited to this, for example, the spectral imaging device incorporating the LCTF 10 into the lens configuration of the present invention as illustrated in FIG. 2 can be used in non-contact detection of flaws and damage such as creases and the like that cannot be seen with the naked eye, by irradiating clothing or skin with infrared light and taking an image. Also, the spectral imaging device can be mounted in a helicopter or the like to carry out remote sensing over a wide range that conventionally was inconceivable, to enable quality control of forestry or agricultural products, or analysis of soil or water quality.

What is claimed is:

1. An optical lens unit comprising:
   a plurality of lens elements disposed between an object surface and an adjacent real image surface conjugate to the object surface, wherein the plurality of lens elements receiving beams propagating from each of off-axial object points on the object surface; and
   an optical tunable filter for selecting any wavelength band of each of the beams;
   wherein at least one light ray contained in each of the beams being parallel to an optical axis of the optical lens in a space between the plurality of lens elements, and the optical tunable filter is disposed in the space.

2. The optical lens unit of claim 1, further comprising a depolarization filter between the object surface and the optical tunable filter.

3. The optical lens unit of claim 2, further comprising a polarization filter between the object surface and the depolarization filter.

4. The optical lens unit of claim 3, further comprising a rotator for changing the polarizing direction of the polarizer.

5. The optical lens unit of claim 1, wherein the at least one light ray comprises the chief ray for each of the beams.

6. An optical device for measuring at least one of wavelength, amplitude and phase of any beam using the optical lens unit of claim 3.

7. A spectroscopic device comprising:
   an optical lens unit comprising a plurality of lens elements disposed between an object surface and an adjacent real image surface conjugate to the object surface, wherein the plurality of lens elements receiving beams propagating from each of off-axial object points on the object surface, and makes at least one light ray contained in each of the beams substantially parallel to an optical axis of the optical lens;

an optical tunable filter for selecting any wavelength of the beam, wherein the optical tunable filter is disposed in a space where the at least one light ray contained in each of the beams is substantially parallel to the optical axis of the optical lens; and a photodetector for detecting the light ray with any wavelength transmitted through the optical tunable filter.

8. An optical device for measuring at least one of wavelength, amplitude and phase of any beam using the optical lens unit of claim 4.

* * * * *